No. 869,780. PATENTED OCT. 29, 1907.
J. P. HAYES.
ELECTRIC MOTOR.
APPLICATION FILED MAR. 8, 1907.
3 SHEETS—SHEET 1.
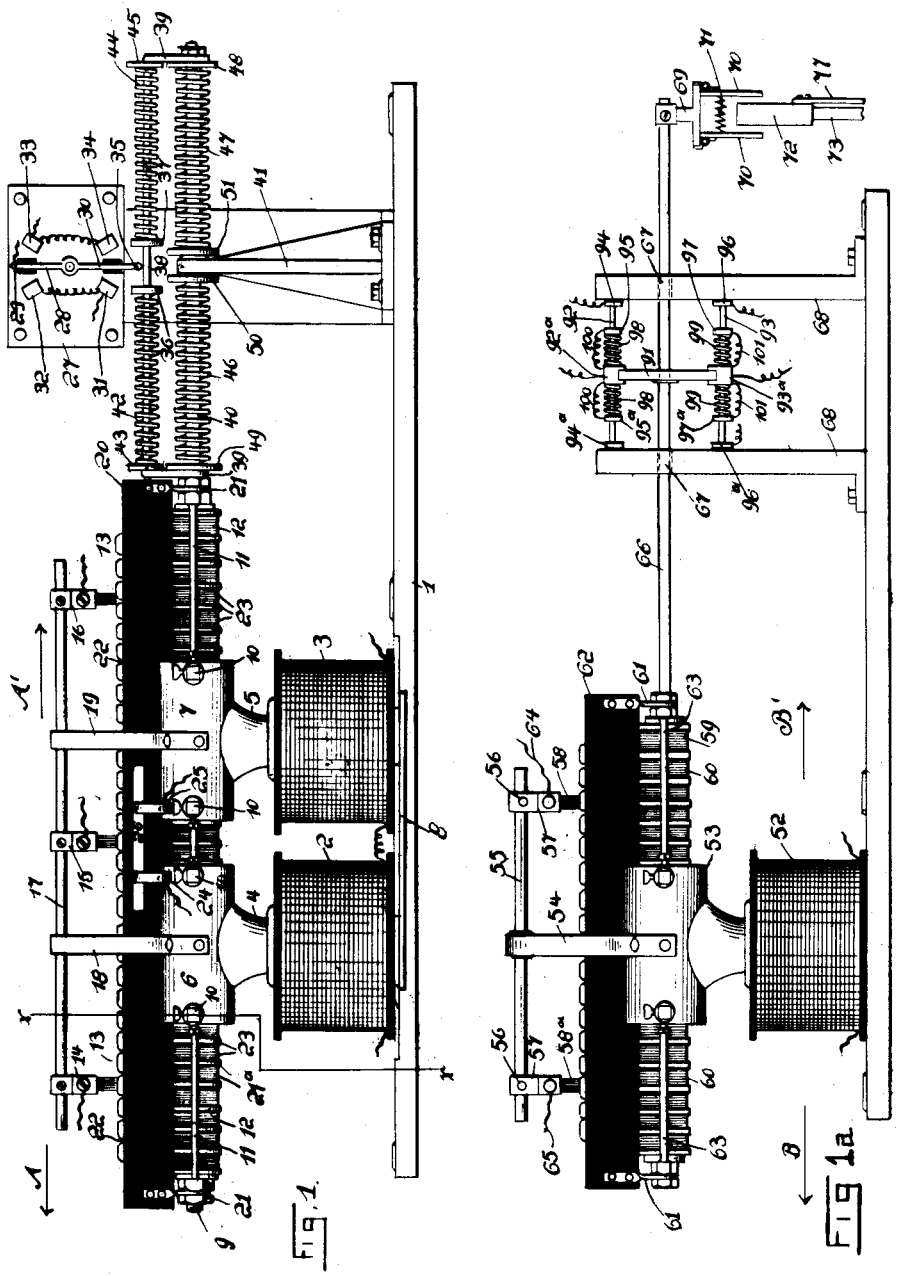
WITNESSES:
INVENTOR
John P. Hayes.
BY
Attorneys No. 869,780. PATENTED OCT. 29, 1907.
J. P. HAYES.
ELECTRIC MOTOR.
APPLICATION FILED MAR. 8, 1907.
3 SHEETS—SHEET 2.
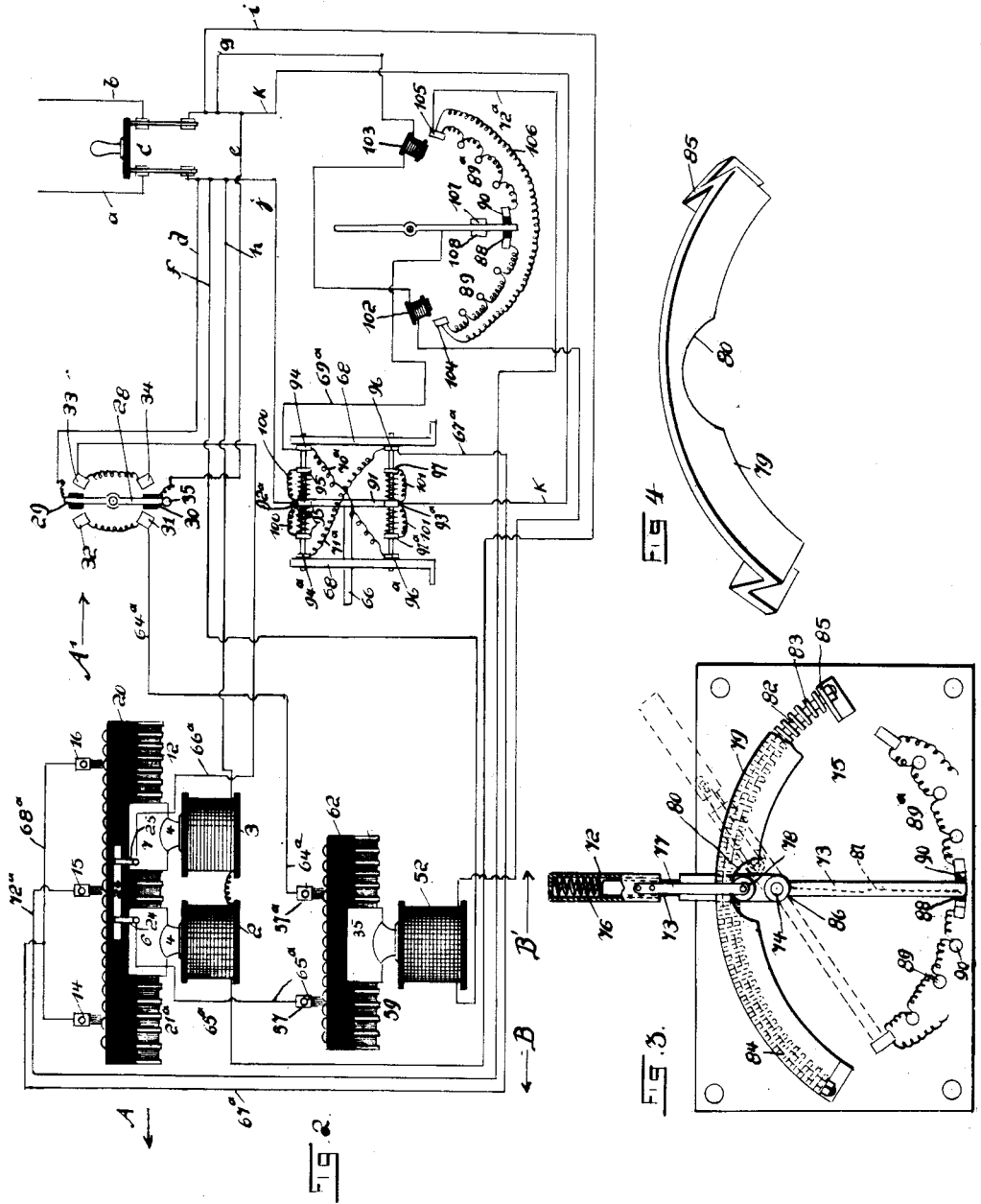
WITNESSES:
INVENTOR
John P. Hayes.
BY
Attorneys No. 869,780. PATENTED OCT. 29, 1907.
J. P. HAYES.
ELECTRIC MOTOR.
APPLICATION FILED MAR. 8, 1907.
3 SHEETS—SHEET 3.
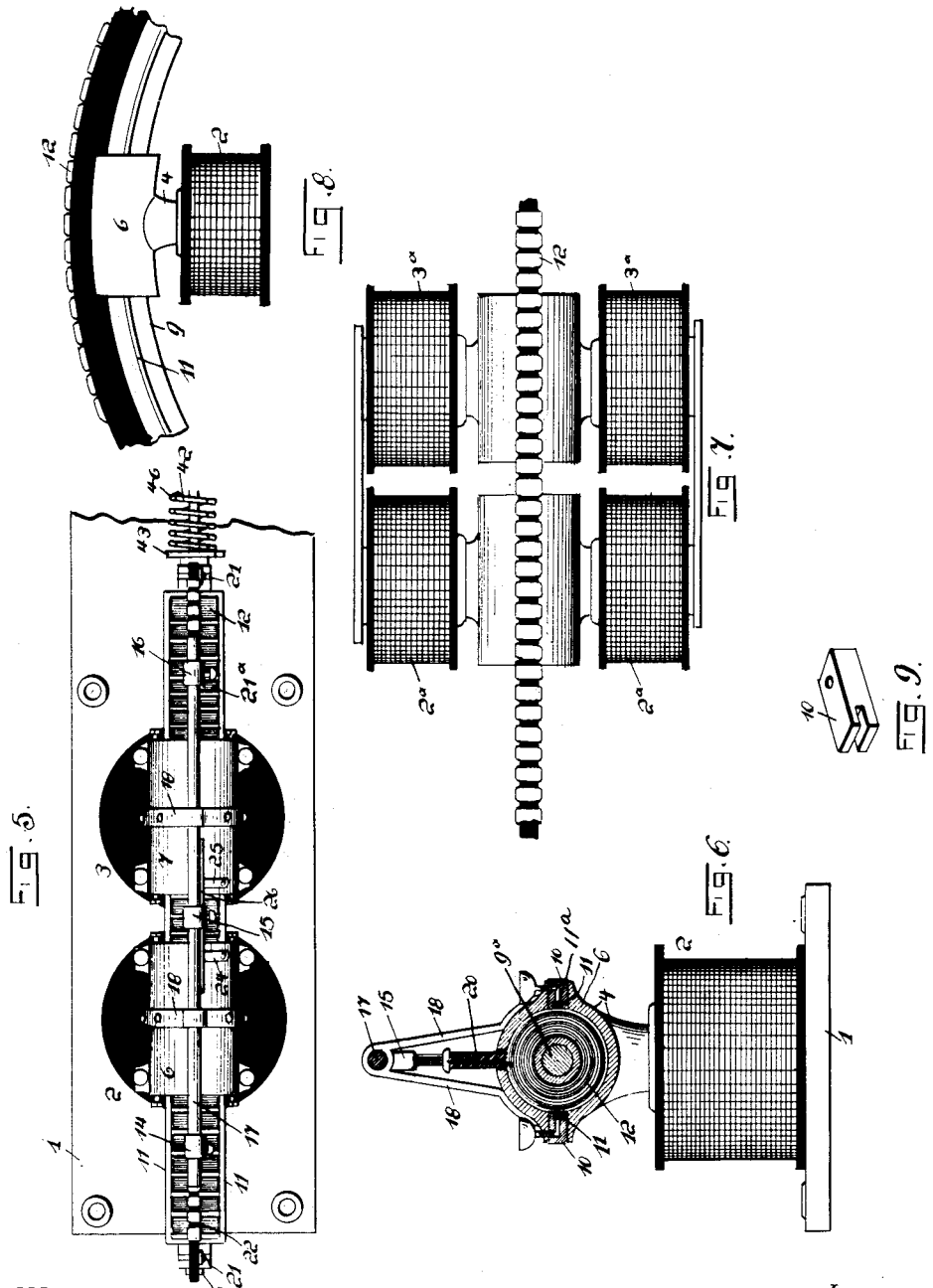
WITNESSES:
C. Klostermann
C. N. Woodward
INVENTOR
John P. Hayes.
BY H. C. Everett & Co.
Attorneys

UNITED STATES PATENT OFFICE.

JOHN P. HAYES, OF PITTSBURG, PENNSYLVANIA.

ELECTRIC MOTOR.

No. 869,780.  Specification of Letters Patent.  Patented Oct. 29, 1907

Application filed March 8, 1907. Serial No. 361,297.

*To all whom it may concern:*

Be it known that I, JOHN P. HAYES, a citizen of the United States of America, residing at Pittsburg, in the county of Allegheny and State of Pennsylvania, have invented certain new and useful Improvements in Electric Motors, of which the following is a specification, reference being had therein to the accompanying drawing.

This invention relates to electro-magnetic motors, of the reciprocating type, and its primary object is to provide a motor of this character so constructed as to insure powerful and efficient action of the reciprocating armature.

A further object of the invention is, to combine with the reciprocating armature, a plurality of coil springs and to utilize the expansive force thereof to supplement the action of the electro-magnetic force to operate the armature, and to automatically operate a reversing switch.

Other objects of the invention will be disclosed as the description proceeds.

The construction of the motor will be fully described hereinafter in connection with the accompanying drawings which form a part of this specification, and its novel features will be defined in the appended claims.

In the drawings:—Figure 1, is a side elevation of a motor embodying the invention, Fig. 1ª is a side elevation of the reverser employed therewith. Fig. 2, is a diagram illustrating the electric connections of the motor, Fig. 3, is a detail view of an automatic rheostat, Fig. 4, is a detail perspective of an arc shaped plate forming a part of the rheostat shown in Fig. 3. Fig. 5, is a top plan view of the motor. Fig. 6, is a vertical section on the line $x$—$x$ of Fig. 1. Fig. 7, is a plan of a modification showing a duplication of field magnets. Fig. 8, is a side elevation of a further modification showing an arc shaped armature, and Fig. 9, is a detail of one of the armature guides.

The reference numeral 1 designates a base upon which are supported field magnets 2 and 3.

Supported upon the field poles 4 and 5 are the pole pieces 6 and 7 of opposite polarity connected to a conductor plate 8 to complete the magnetic circuit.

A reciprocating armature 21ª is supported in grooved guide-blocks 10 carried by the pole-pieces, said armature having diametrically-opposite longitudinal slides 11 fitting within the grooves of the guide-blocks.

The pole pieces are recessed as shown at 11ª to permit the slides 11 to reciprocate without contact with the pole pieces.

The windings of the armature coils 12 are of the Gramme ring type, that is to say, a number of coils wound on sections are connected in series the loops of adjacent coils being connected to the commutator segments 13.

Instead of having a continuous circuit winding as in the revolving armature of the Gramme ring type, I leave one end of the first coil of the armature, and one end of the last coil open, for the reason that, the only energized coils are those between the outermost brushes on the commutator while all of the coils on the armature are in a continuous circuit the ends of the first and last coils being connected together those coils outside of the brushes are not in the magnetic circuit. In this type of armature an open circuit is preferable to a closed circuit throughout the windings.

A feature of the present invention is, that I employ one more brush on the commutator than there are field poles, the brushes employed having alternate signs, thus producing within the magnetic circuit two armature poles for each magnetic field pole.

If one field pole is used two brushes are provided for the commutator; if two poles are used, three brushes are employed on the armature; in using three field poles, four brushes are provided and so on.

In the illustration on Fig. 1, two field-pole pieces are shown, and three brushes suspended from holders 14, 15 and 16 secured by set screws upon a rod 17 supported by arms 18 and 19 secured to opposite sides of the pole-pieces 6 and 7.

The armature shaft 9 is threaded at one end for attachment to any mechanism to be operated by the motor, and said armature is clamped to the commutator 20 by clamps 21.

The segments of the commutator are separated by insulations 22, and the armature coils 12 are insulated from the soft laminated core of the armature by insulations 23.

The numerals 24 and 25 designate automatic cut-off brushes contacting with a metallic contact-bar 26 supported at the side of the commutator. The function of these brushes will be explained hereinafter.

The numeral 27 designates a reversing switch comprising a pivoted lever 28 carrying switch blades 29 and 30 insulated from the lever 28. Two pairs of contacts 31 and 32, and 33 and 34 are arranged adjacent to the switch blades, the members of each pair being connected by wire conductors as shown. The lever 28 is provided with an extension 35 which depends into the path of movement of two disks 36 and 37 secured upon a rod 38 connected by angle brackets 39 to a rod 40 constituting an extension of the armature shaft, and extending through a bearing in the upper end of a standard 41 rising from the base 1.

Encircling the rod 38 is a coil spring 42 bearing at one end against the disk 36 which latter is movable upon the rod 38, and secured at its opposite end to a disk 43 mounted on said rod. Another coil spring 44 encircles the rod 38 one end of which bears against the disk 37, while its opposite end is secured to another disk 45 mounted on the rod.

The armature rod extension 40 is also encircled by two coil springs 46 and 47 secured at their outer ends to disks 48 and 49 and bearing at their inner ends against disks 50 and 51 movable on the rod 40 on opposite sides of the standards 41.

In connection with the motor constructed as thus described, I employ a reverser comprising a field magnet 52, having a pole-piece 53 from which projects arms 54 to support a rod 55 upon which are secured by set screws 56 brush holders 57 carrying brushes 58 and 58ᵃ.

The numeral 59 designates the armature of the reverser having coils 60, and secured by clamps 61 to a commutator 62. The armature 59 is provided with diametrically opposite slides 63 which are movably supported in guides at the ends within the pole piece 53.

The brush 58 is connected by a conductor 64 with the contact 31 of the switch 27, and the brush 58ᵃ is connected by a wire 65 to the automatic cut-off brush 24.

The armature 59 of the reverser is provided with a rod extension 66 which extends through bearings 67 formed in parallel standards 68, and carries at its outer end a bracket 69 from which depend parallel arms 70, hinged to the bracket in such a manner as to permit them to move inward but not outward and connected by a coil spring 71. Between these spring-connected arms 70 extends the upper end of a socket 72 fitted upon the upper end of a lever 73 forming a part of the automatic rheostat.

The lever 73 is secured upon a pivot 74 projecting from the front plate 75 of the rheostat, and within the socket 72 is a coil-spring 76 which rests upon the upper end of the lever, and the socket freely slides upon the lever.

Secured to the socket 72 is a rod 77 carrying at its lower end a pulley 78 which travels on an arc shaped guide 79, provided with an eccentric off-set 80, and having a curved rod 82 secured thereto at its ends.

Upon the curved rod 82 are supported coil springs 83 and 84, the spring 83 having bearing at one end against the guide 79 at the point 85 and at its opposite end against the lever 73. The other spring 84 bears at one end against the guide 79 and at its opposite end against the lever 73.

A metallic washer 86 is mounted upon the pivot 74 and insulated therefrom, and from the lever 73, and a wire conductor 87 leads from said washer to a metallic contact 88 which is also insulated from the lever 73.

The numeral 89 designates a plurality of contacts and resistances, divided by insulations 90.

In connection with the automatic rheostat on the extension rod 66 there is provided a reverser 9, comprising a cross arm 91 secured to the rod 66, and two parallel insulated rods 92 and 93 extending through metallic conductors 92ᵃ and 93ᵃ at the end of the cross-arm 91, and through metallic contacts 94 and 95 and 96 and 97. Coil springs 98 and 99 encircle the rods 92 and 93. These springs are connected at their ends to the adjacent metallic conductors, and the latter are electrically connected by flexible conductors 100 and 101.

Metallic conductors 92ᵃ and 93ᵃ are secured upon the ends of the cross arm 91 and insulated therefrom. The contacts 94 and 96 and 94ᵃ and 96ᵃ are secured to the standards 68 while the other contacts on the rods 92 and 93 as well as the coil springs 98 and 99 move with the cross arm 91.

In the modification shown in Fig. 7, the construction is similar to that already described, except that four field magnets 2ᵃ and 3ᵃ are employed instead of two. In other words the field magnets are duplicated, and it will be apparent that the number of those magnets employed may vary as desired.

In Fig. 8, the armature and commutator are curved or of arc shape instead of horizontal as in the other figures. In this form of the invention the armature will reciprocate in an arc shaped path.

The operation of the motor is as follows:—The two main line conductors $a$ and $b$ are controlled by a switch $c$ and there are four circuits. $d\,e, f\,g, h\,i, j\,k$ leading from the main line $a\,b$.

$d$ is connected to knife 29 and $e$ to knife 30 of the switch lever 28. Brush holder 57ᵃ of the reverser is connected by conductor 64ᵃ to contact 31 of the reverser switch and the other reverser brush 57 is connected by a conductor 65ᵃ to the automatic cut-off brush 24. The other automatic cut off brush 25 is connected by a wire 66ᵃ to contact 33 of the reverser switch.

Connected in series with the line $f$ which is tapped from main line $a$ through switch $c$, are the magnet coil 52 of the reverser, rheostat magnets 102 and 103 back to the line $b$ through wire $g$.

Line $h$ is connected to main line $a$ through switch $c$ and makes its circuit through field coils 2 and 3 and back to line $b$ by wire $i$.

Line $j$ connected to main line $a$ through switch $c$ connects to metallic conductor 92ᵃ and the other side of line $k$ connects metallic conductor 93ᵃ.

Brush holders 14 and 16 are connected together by a wire 68ᵃ, and wire 68ᵃ connects contact 96 of the reverser-switch by wire 67ᵃ.

Contact 94 connects to washer 86 of rheostat lever by wire 69ᵃ, and washer 86 connects to contact 88 by wire 87.

Contacts 94 and 96 of reverser-switch are connected by wires 70ᵃ and 71ᵃ to 96ᵃ and 94ᵃ.

Contacts 104 and 105 of the rheostat are connected by a shunt wire 106 and the contact 105 of rheostat connects to the brush-holder 15 by wire 72ᵃ.

In closing the main switch $c$, magnets 2 and 3 are energized across main lines $ab$ through wires $h, i$.

Magnet coil 52 of the reverser is energized across the main line in series with rheostat magnets 102 and 103 by wires $fg$.

For the armature 21ᵃ to travel in direction of arrow A it is necessary for knife 29 of the reverser switch 27 to have connection with contact blades 32, and knife 30 to have connection with contact blades 34, the lever 28 in the above named position closing the circuit in wires $d$, $e$ as follows:— from main line $a$ through switch $c$ to wire $d$ to knife 29 of reverser-switch to contact 32 through wire to contact 31 to wire 64ᵃ to brush 57ᵃ, through armature 59 to brush 57 to wire 65ᵃ to automatic cut-off brush 24 through metallic conductor 26 to automatic cut-off brush 25, to wire 66ᵃ to contact 33, through wire to contact 34 to knife 30 back to the main line through wire $e$ and switch $c$.

It will be seen that the reverser switch 27 closed in either direction with the main switch $c$ closed and the automatic contact brushes 24 and 25 on metallic plate 26ᵃ circuit is established in wires $d\,e$.

The relative magnetic fields produced by current passing through field magnet 52 and through the coils on armature 59 is arranged by a proper connection so that the armature moves through the magnetic fields in direction of arrow B, when the lever 28 of the reverser switch 27 is in the above named position.

By placing the automatic cut off brushes 24 and 25 on metallic plate 26 close to each other, the current is cut off later in the stroke of the armature, and if the distance is increased between brushes 24 and 25 the current is cut off earlier in the stroke.

When the above named switches are closed as stated above armature 59 moves in direction of arrow B. pulling in the same direction cross arm 91 with accompanied contact and springs of the reverser switch, and also bracket 69 with rheostat lever 73 between arms 70 and 70 when contacts 97ᵃ and 96ᵃ, and 94ᵃ and 95ᵃ are made a circuit is established through wires j k as follows:—from main line a to wire j to metallic conductor 92ᵃ through wire 100 to contact 95ᵃ to contact 94ᵃ through wire 71ᵃ to contact 96, through wire 67ᵃ to wire 68ᵃ to brushes 14 and 16 through armature 21ᵃ to brush 15 to wire 72ᵃ to contact on rheostat 105, through resistance 89ᵃ to contact 88 on rheostat lever, through wire 87 to washer 86 to contact 94 to contact 96ᵃ by wire 70ᵃ to contact 97ᵃ to wire 101 to wire k to wire b through switch c.

When the circuit in wires jk is closed as above described armature 21ᵃ moves in direction of arrow A.

As armature 59 moves in direction as stated above springs 98 and 99 of the reverser switch compress, and at the same time lever 73 is pulled around by bracket 69 cutting out resistance 89ᵃ; as the lever 73 is in motion pulley wheel 78 travels on eccentric 80 pulling down socket 72 and increasing tension in spring 76, and also in spring 84. When contact 88 is on contact 105 resistance 89ᵃ is out of circuit and armature 107 of the lever is attracted by magnet 103, and when the lever is in this position socket 72 is low enough to allow the bracket arm 70 to pass over it. As arm 70 releases from socket 72 spring 71 pulls arms 70 and 70 towards each other enough to allow the clearance of socket 72 on the return stroke.

As armature 21ᵃ moves the cut-off brushes slide on plate 26 and disk 37 presses against lever handle 35 by spring 44. The spring 47 is also compressing as rod 40 passes through standard 41 and disk 51, when brush 25 slides off plate 26 it opens the circuit to armature 59 and the expansion of springs 98 and 99 pulls armature 59 to a central position. Springs can be encircled on rod 66 between cross arm 91 and standard 68 of the reverser switch to assist 98 and 99 in bringing armature 63 to a central position when circuit is open, thereby opening the circuit of armature 21ᵃ. About the finish of the stroke of armature 21ᵃ the increased pressure in spring 44 forces the lever to contact blades 31 and 33, and at finish of stroke in armature 21ᵃ the spring 47 expands which causes armature 21ᵃ to move in direction of arrow A¹, and as the brush 25 slides again on plate 26 which closes the circuit to armature 59, but in an opposite direction causing armature 59 to move in direction of arrow B¹ making contacts 97 and 96 and 95 and 94 of the reverser switch. The circuit then to armature 21ᵃ which causes it to continue the stroke started by spring 47 is as follows;—from main line a to j to metallic conductor 92ᵃ to contact 95 to contact 94 to wire 69ᵃ to washer 86 to wire 87 to contact on brush 88 to contact 105 to wire 72ᵃ to brush 15 through armature 21ᵃ to brushes 14 and 16 to wire 68ᵃ to 72ᵃ to contact 96 to contact 97 through wires 101 and spring 99 to the metallic conductor 93ᵃ to wire k to the main line b.

As armature 21ᵃ moves in the last named direction brush 24 will slide off plate 26 nearing end of stroke, opening the circuit to armature 59; springs 98 and 99 of the reverser switch force armature in the direction of arrow B breaking at 97 and 96, 95 and 94 thereby opening the circuit to armature 21ᵃ. Springs 42 and 46 operate in like manner as springs 44 and 47.

When switch c is open all circuits to main line a b are open. Magnet 103 releases armature 107 and the expansion of spring 76 in socket 72 with the assistance of spring 84 forces socket 72 of lever 73 between arms 70 and 70 of bracket 79. When armature 59 is started on the closing of switch c in the direction of arrow B¹ resistance 89 is cut out of circuit, contact 104 makes contact to 105 through shunt wire 106. Operation of lever 73 in the last named direction are the same as the direction before described.

I have described as shown in the diagram that the current is reversed in the armature 21ᵃ and 59, but if desired the current can be reversed in the field magnets of their respective armatures, and other changes, can be made in the various circuits not shown in diagram Fig. 2, to give different results, for instance if connections are changed on magnet coils 2 and 3 that they be in circuit with wires d, e in series with reverser switch 27, automatic cut-off brushes 24 and 25 and armature 59 then the current will be reversed in the said magnets, but to make this connection wires on the reverser switch 71ᵃ and 70ᵃ must be made so they will not cross each other, that is wire 71ᵃ connect 94ᵃ to 94, and wire 70ᵃ connect contact 96ᵃ to contact 96 with the said changes in the reverser switch the current will not be reversed in armature 21ᵃ. It will then be seen in the above changes that the circuits are open to armature 21ᵃ and to field magnets 2 and 3 about the same time thereby leaving the armature free to move at the finishing of its stroke without the influence of a magnetic field.

There are three brushes on commutator Fig. 1, as will be seen and they are connected so that adjacent brushes have unlike signs, that is if brush 14 is negative, brush 15 will be positive and brush 16 negative or vice-versa, brush 14 positive, brush 15 negative and brush 16 positive. Brushes of like signs may be connected together.

By having three brushes on a motor having two field poles it affords two paths for the current in the armature winding, and produces in the armature two juxtaposed magnetic poles and two free magnetic poles, that is to say if the juxtaposed poles are north poles the free poles are south poles, or if the juxtaposed poles are south poles the two free poles are north poles.

The position of the north and south magnetic poles in the armature depends on the direction the wire is wound on the armature, and where the current enters and leaves the armature.

The juxtaposed magnetic poles join between pole-pieces 6 and 7 and their neutral points are one about the center of pole piece 6 and one about the center of pole-piece 7, and the two free magnetic poles are one outside of pole piece 6 about under brush 14 having its neutral points under pole piece 6 and the other free magnetic pole beginning outside of pole piece 7 and having its neutral point under said pole piece.

As the magnetic density is greater about the center of pole-pieces 6 and 7 and diminishes towards the ends. It will be seen that the magnetic neutral points of the armature are in the maximum magnetic fields, and the neutral points and weak points of the magnetic field are at points where the magnetic poles in the armature are greatest, thereby creating a strong magnetic attraction and repulsion. In some cases the brushes may be shifted either way to advantage.

The magnetic poles of the armature are maintained about the same position with relation to the magnetic field poles in the movement of the armature 21ª as the only energized armature coils are between brushes 14 and 16.

If the armature 21ª moves in direction of the arrow A the commutator segments 13 pass under the brush 14 in succession the armature coils connected thereto are included in the circuit and those passing successively from under brush 16 are cut out of this circuit.

When armature 21ª moves in opposite direction armature coils are cut in and out of circuit in like manner.

Having fully described my invention what I claim and desire to secure by Letters Patent is:—

1. In an automatic reciprocating electric motor, a field pole with magnet coils thereon and a pole-piece and armature, said pole-piece surrounding the armature and being recessed to provide a clearance for the movement of the armature, guides on said pole-pieces and slides on said armature supported by said guides.

2. In an automatic reciprocating electric motor, the combination with a field pole with magnet coils thereon, and a pole-piece, of an armature provided at diametrically opposite sides with longitudinal projecting slides, a pole-piece surrounding said armature and formed with longitudinal recesses to provide passages for said slides, and grooved guide-blocks within which said slides travel.

3. In an automatic reciprocating electric motor, the combination with an armature provided with diametrically opposite longitudinal slides, magnet coils on the magnet core, a commutator, and a pole-piece surrounding the armature and formed with recesses for the passage of the armature slides, and grooved guide-blocks for supporting said slides.

4. In an automatic reciprocating electric motor, the combination with an armature shaft of a commutator secured thereto, pole-pieces surrounding said armature, a metallic contact-bar, and adjustable cut-off brushes supported by said pole-pieces.

5. In a reciprocating electric motor, the combination with field magnets, field poles, and pole-pieces, of a reciprocating armature surrounded by said pole-pieces, a commutator secured to said armature, brushes supported above the commutator, and a cut-off device comprising a metal contact bar carried by the commutator, and brushes bearing thereon and supported by the pole-pieces.

6. In a reciprocating electric motor, the combination with field magnets, field-poles and pole-pieces, of a reciprocating armature surrounded by said pole-pieces, a commutator clamped to said armature, a rod extension from one end of the armature shaft, springs on said rod and disks confining said springs.

7. In a reciprocating electric motor, the combination with a base, and field magnets thereon of a conductor plate connecting said magnets, field-poles and pole-pieces, a reciprocating armature surrounded by said pole-pieces, a commutator secured to said armature, brushes supported above the commutator, a rod extension from the armature shaft, spiral springs on said rod, disks confining said springs, a reverser-switch, and means carried by said rod extension for automatically operating said switch.

8. In a reciprocating electric motor, the combination with a base and field magnets thereon, of a conductor-plate connecting said magnets, field-poles and pole-pieces, a reciprocating armature surrounded by said pole-pieces, a commutator secured to said armature, brushes supported above the commutator, a rod extension from the armature shaft, spiral springs on said rod, disks confining said springs, a reverser-switch and means carried by said rod extension for automatically operating said switch, consisting of a rod secured to said rod extension, spiral springs on said rod, and disks for confining said springs.

9. In a reciprocating electric motor, the combination with a reciprocating armature, of a reverser-switch operated by the movement of the armature, and a reverser electrically connected to said switch and to the motor, comprising a reciprocating armature, a commutator, and a rheostat operated by the armature of the reverser.

10. In a reciprocating electric motor, the combination with a reciprocating armature, and a commutator secured thereto, of a rod extension from the armature shaft, a standard through which said rod extends, coil springs on said rod extension, disks on said rod for confining said springs, a second rod secured to said rod extension, springs and disks on said second rod, and a reversing-switch adapted to be operated by contact with the disks on said second rod.

11. In a reciprocating electric motor, the combination with a reciprocating armature and its commutator, a reversing switch, means for automatically operating said switch, a reverser electrically connected to said switch, and a rheostat located adjacent to said reversing switch.

12. In a reciprocating electric motor, an automatic rheostat comprising a pivoted lever, a rod secured thereto, a roller carried by said rod, a spring controlled socket on said lever, and an arc shaped guide formed with an eccentric recess within which said roller travels.

13. In a reciprocating electric motor, the combination with the field poles and armature of a commutator provided with one more brush than there are field poles to produce two armature poles for each magnetic field pole.

14. In a reciprocating electric motor, the combination with the armature and field poles of a commutator having a plurality of brushes the number of said brushes exceeding the number of field poles to create a greater number of armature poles than there are field poles.

In testimony whereof I affix my signature in the presence of two witnesses.

JOHN P. HAYES.

Witnesses:
C. V. WATERMANN,
MAX H. SROLOVITZ.